No. 794,987. PATENTED JULY 18, 1905.
G. M. KNEUPER.
PACKING.
APPLICATION FILED NOV. 30, 1904.
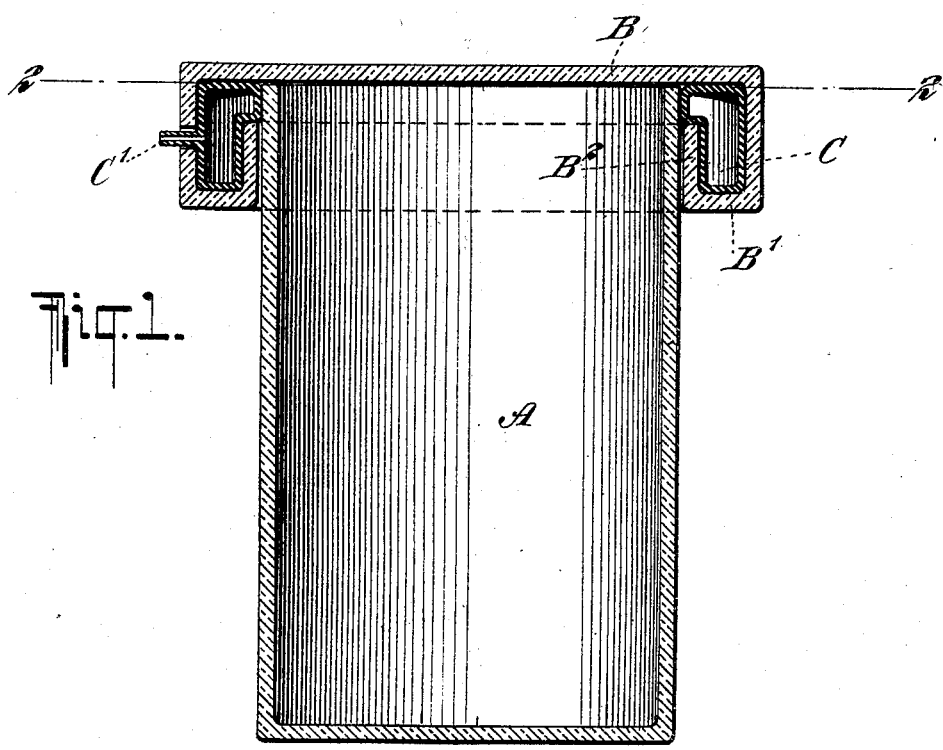
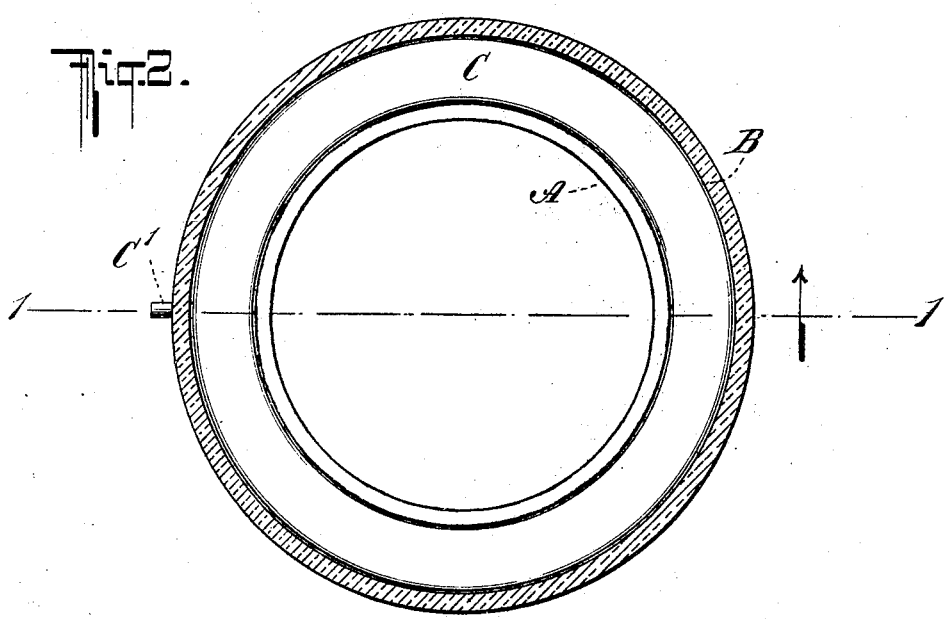
Witnesses
Julius H. Lutz
John Lotka
Inventor
George M. Kneuper
By his Attorneys
Briesen & Knauth No. 794,987.

Patented July 18, 1905.

UNITED STATES PATENT OFFICE.

GEORGE M. KNEUPER, OF NEW YORK, N. Y.

PACKING.

SPECIFICATION forming part of Letters Patent No. 794,987, dated July 18, 1905.

Application filed November 30, 1904. Serial No. 234,857.

*To all whom it may concern:*

Be it known that I, GEORGE M. KNEUPER, a citizen of the United States, and a resident of the borough of Brooklyn, county of Kings, city and State of New York, have invented certain new and useful Improvements in Packings, of which the following is a specification.

My invention relates to packings for joints of any description, and has for its object to produce a perfect joint and yet to make it possible to easily separate the joined sections, if desired.

Reference is to be had to the accompanying drawings, in which I have illustrated my invention as applied to a jar, although I wish it distinctly understood that my invention may be used wherever two sections or parts are joined together and it is desired to have a tight joint.

In the drawings, Figure 1 is a sectional view of a jar on the line 1 1 of Fig. 2, and Fig. 2 is a horizontal section on the line 2 2 of Fig. 1.

A represents the jar proper, which may be of any desired construction, and B is the cover of said jar A. The cover B is provided with an inturned flange B', which has a sliding engagement with the outer periphery of the jar A.

C is a hollow packing capable of being inflated and is made of rubber or other suitable material and is provided with an air-inlet tube or valve C', which extends through a suitable opening in the cover B. The said packing C is placed in the annular space formed by the top and side wall of the cover B and the flange B' in a deflated condition, the air-inlet tube or valve C' being inserted in the opening in the cover B, which is provided for this purpose, and the cover is then placed on the jar. The packing C will then be situated between the outer periphery of the jar and the inner surfaces of the top and side wall of the cover B and the flange B' and is then inflated by means of an air-pump or in any other suitable manner, the air being pumped or forced into the packing C to a pressure greater than that to which the joint is to be subjected. As the packing C is inflated it will practically fill the annular space between the jar and the cover, thus forming an air-tight and perfect joint. By deflating the ring C the cover can be readily removed from the jar.

My invention will be found valuable for use in preserving fruits and vegetables and for other purposes where a hermetic joint is required. It also obviates the usual difficulty of removing the cover from ordinary jars of this description, as no matter how great the pressure in such ring C the moment the ring is deflated there is nothing to prevent the cover from being removed.

Instead of having the air-inlet tube C' extend through the cover B to the outside the said inlet-tube might be so arranged that air could be introduced into the packing C from the inside.

At the inner edge of the flange B', I may provide a ring $B^2$, extending toward the body of the cover B, but terminating short thereof, so as to leave a space through which the packing C may project into engagement with the jar A, which forms the inner member. With this construction the packing C is held more securely than when ring $B^2$ is omitted, particularly when the packing is deflated. The provision of the ring $B^2$ also prevents any tendency of the packing C to roll along the inner member A in case there should be a longitudinal strain at the joint. However, in many cases the structure would operate satisfactorily without the ring $B^2$.

Various modifications may be made without departing from the nature of my invention.

What I claim, and desire to secure by Letters Patent, is—

1. The combination of two members, one of which is adapted to project into the other, the outer member having a flange arranged for sliding engagement with the inner member at a distance from its end, and an inflatable packing arranged between said members, and in engagement with said flange.

2. The combination of an inner member, an outer member having two parallel portions at a distance from each other, the inner edge of one of said portions being adapted to slide along the inner member, and an inflatable packing located between the two members, and in engagement with said two parallel portions of the outer member.

3. The combination of an inner member, an outer member provided at its end with an inwardly-projecting portion, capable of sliding lengthwise of said inner member, and an inflatable packing located between said members, and in engagement with said inwardly-projecting portion.

4. The combination of an inner member, an outer member having a portion surrounding said inner member at a distance to form an annular chamber, and provided with an inwardly-projecting portion at the end of said chamber and with a returning-ring at the inner edge of said inwardly-projecting portion, and an inflatable packing located between said members and in engagement with said ring.

5. The combination of two members, one of which is adapted to project into the other, one of said members being provided with a flange in sliding engagement with the other member, and an inflatable packing arranged between said members and in engagement with said flange.

6. The combination of two members, one of said members having two parallel portions at a distance from each other, the one edge of one of said portions being adapted to slide along the other member, and an inflatable packing located between the two members, and in engagement with the said two parallel portions of the one member.

GEORGE M. KNEUPER.

Witnesses:
  JOHN LOTKA,
  JOHN A. KEHLENBECK.